May 12, 1970 — A. M. WANNINGER — 3,512,079

TIMING ADVANCE TESTER CIRCUIT

Filed Oct. 7, 1968 — 2 Sheets-Sheet 1

Inventor:—
Albert M. Wanninger
By Hofgren, Wegner, Allen, Stellman & McCord
Attys.

Fig. 3(a) NORMAL SPARK PLUG VOLTAGE 4Kv

Fig. 3(b) VOLTAGE ACROSS R. & C₂ POINT 36  150v  67

Fig. 3(c) INPUT TRIGGER TO MULTIVIBRATOR POINT 40  9.1v

Fig. 3(d) COLLECTOR VOLTAGE Q₂ POINT 50  9.1v  $t_1$

Fig. 3(e) TRIGGER PULSE IN ADVANCE POSITION POINT 62  2.5v  61  61a

Fig. 3(f) COLLECTOR VOLTAGE Q₁ POINT 65  9.1v

Fig. 3(g) TRIGGER PULSE IN TIMING POSITION POINT 62  2.5v  66  66a

United States Patent Office 3,512,079
Patented May 12, 1970

3,512,079
TIMING ADVANCE TESTER CIRCUIT
Albert M. Wanninger, Prospect Heights, Ill., assignor to Peerless Instrument Co., a corporation of Illinois
Filed Oct. 7, 1968, Ser. No. 765,590
Int. Cl. G01m 15/100
U.S. Cl. 324—16     8 Claims

ABSTRACT OF THE DISCLOSURE

A tester circuit for controlling the operation of a standard timing light for indicating the ignition advance of the spark plugs of an automotive engine, such as an automobile engine. The control circuit includes a manually operable control for introducing a time delay in the flashing of the timing light to correspond with the advance in time of the spark plug firing occurring with an advance in speed of the automotive engine. The ignition advance tester is arranged for facilitated connection to the automotive engine components and conventional timing lights. The control circuit includes improved power supply means utilizing the high voltage power supply of the ignition system as a power supply source for a high voltage circuit portion thereof.

BACKGROUND OF THE INVENTION

Field of the invention

This invention relates to control circuits and in particular to control circuits for use in ignition advance testers.

Description of the prior art

In conventional ignition advance testers, relatively expensive power supplies are utilized for providing high voltages in the control circuitry thereof. Illustratively, a conventional power supply circuit for such use includes a transformer, rectifier and filter circuit adapted to provide a voltage of approximately 200 volts from a conventional 60-cycle 110-volt power supply. Such a power supply has the disadvantage of requiring the availability of the conventional 60-cycle 110-volt power supply and, thus, has undesirable limitations where the automobile ignition is to be tested out of doors remote from conventional 110-volt power supplies.

One suggested solution to the problem has been to utilize a direct current-to-direct current converter adapted to be operated by the automobile battery, or similar auxiliary battery. Such a power supply has the further disadvantage of increased cost as such circuits normally include a number of transistors, transformer, rectifier and filter capacitor components.

SUMMARY OF THE INVENTION

The present invention comprehends an improved ignition advance tester which is extremely simple and economical of construction and avoids the disadvantages of the above discussed conventional testers. In the illustrative embodiment, the high voltage control circuit portion of the tester obtains its power from the automotive engine ignition circuit and, more specifically, by connection thereof to a spark plug of the automotive engine. The spark plug voltage is impressed across a suitable capacitor to provide a direct current operating voltage for the high voltage portion of the tester. A control resistor may be connected in parallel with the capacitor for adjusting the voltage to a preselected value, such as 150 volts, when the automotive engine is operating at a preselected speed, such as 2000 r.p.m.

The high voltage is allowed to vary as a function of the speed of the engine as the control circuit is adapted to accommodate such variation without affecting the ignition advance testing indication.

The control circuit further includes a low voltage portion adapted to be connected to the conventional direct current battery of the engine. The low voltage circuit portion operates a conventional monostable multivibrator for cooperating with the high voltage circuit portion in operating a pulse generator to provide suitable pulses for the timing light. A manually operable control knob is provided for adjusting the advance indication on a suitable meter so that the advance of the ignition is indicated on the tester meter when the timing light shows the timing mark of the engine in the same position as when the initial timing was set.

More specifically, the invention comprehends the provision of a new and improved means for operating a tester having a timing light for testing the timing advance of an automotive ignition including first means connected to the low voltage battery power supply defining a low voltage circuit portion of the tester, second means connected to the high voltage spark plug firing power supply defining a high voltage circuit portion of the tester, and means operably associated with the first and second circuit portion means for developing an adjustably delayable pulse suitable to operate the timing light.

Still further, more specifically, the invention comprehends the provision of such a testing means wherein the high voltage circuit portion of the tester is provided with electrical power directly from a spark plug of the engine.

BRIEF DESCRIPTION OF THE DRAWING

Other features and advantages of the invention will be apparent from the following description taken in connection with the accompanying drawings wherein:

FIGS. 3(a)–3(g) are a series of graphs illustrating different voltage wave forms in the tester at different points in the circuit.

DESCRIPTION OF THE PREFERRED EMBODIMENT

Figure 1:
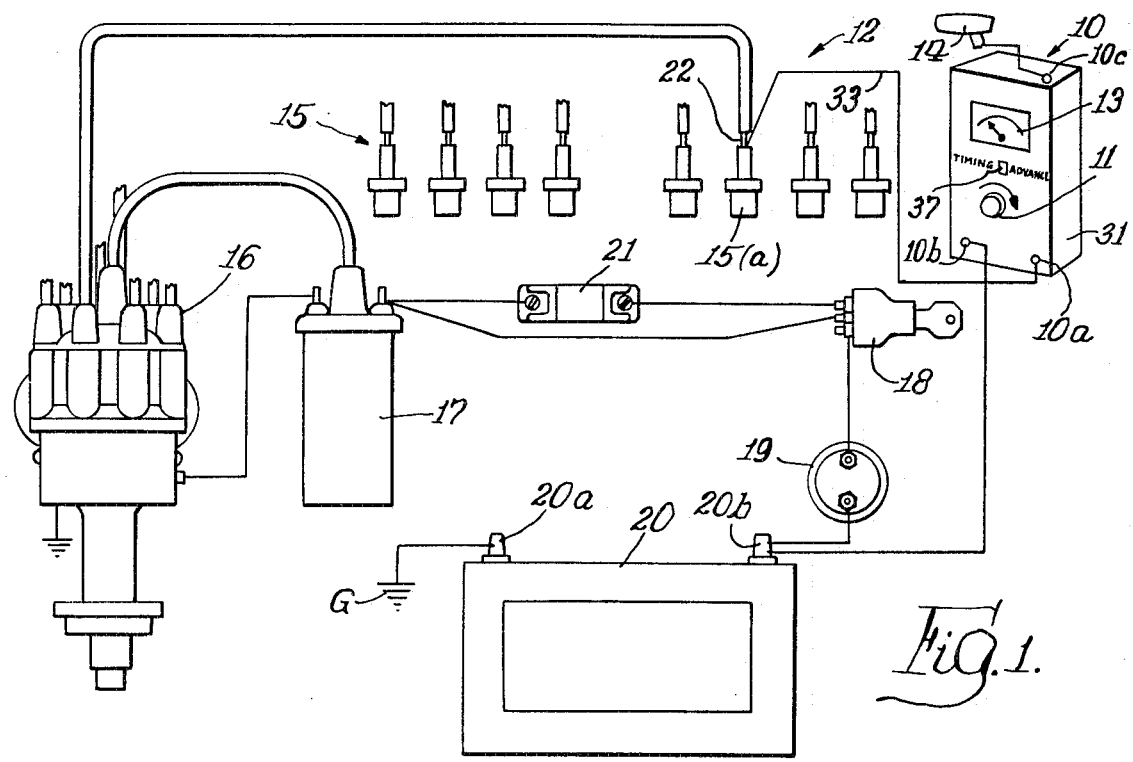
FIG. 1 is a schematic wiring diagram of an ignition advance tester embodying the invention connected to portions of an automotive engine ignition system for indicating the timing advance thereof.

In the exemplary embodiment of the invention as shown in the drawing, an ignition advance tester generally designated 10 is shown to comprise a portable test instrument having a manual control knob 11 for adjusting the tester to indicate the ignition advance of an automotive engine ignition circuit 12. The tester is provided with a meter 13 from which the angular advance indication may be read. The tester 10 is adapted for use with a conventional timing light 14.

More specifically, as shown in FIG. 1, the automotive engine ignition circuit 12 may include a plurality of conventional spark plugs 15, a conventional distributor 16, an ignition coil 17, an ignition switch 18, a dash ammeter 19, and a conventional direct current battery 20 which may comprise a conventional 12-volt battery. As shown, one pole 20a of the battery may be connected to ground G and the other pole 20b may be connected in series through ammeter 19, ignition switch 18, terminal block 21, ignition coil 17, and distributor 16, to the electrode 22 of a selected spark plug (such as spark plug 15a) and one terminal 10a of tester 10. A second terminal 10b of tester 10 may be connected directly to the battery terminal 20b. The timing light 14 may be connected to a third terminal 10c of the tester 10 to complete the hookup of the tester for testing the ignition advance of the automotive engine.

As indicated briefly above, the tester 10 is used in indicating the ignition advance of an automotive engine by showing on the meter 13 thereof an engine degree indication obtained by manual adjustment of the control knob 11 while utilizing the timing light 14 to view a conventional timing mark (not shown) on the engine. Thus, in the conventional ignition advance tester, the speed of the engine is increased so as to cause the timing mark to move away from the pointer while being viewed with the pulsating light of the conventional timing light. Such advance is necessary to provide optimum operation of the automotive engine and accurate control thereof is highly desirable in the proper functioning of the engine such as for minimizing incomplete combustion which may tend to form smog and the like. The tester 10 functions to provide the desired indication by introducing a time delay into the pulsating of the timing light 14 coordinated with the advance in timing of the spark plug firing by adjustment of the control circuit of tester 10 by means of the manual control knob 11. The invention comprehends the provision of an improved control circuit in tester 10 which is extremely simple and economical while yet providing high accuracy in such ignition advance indication.

Figure 2:
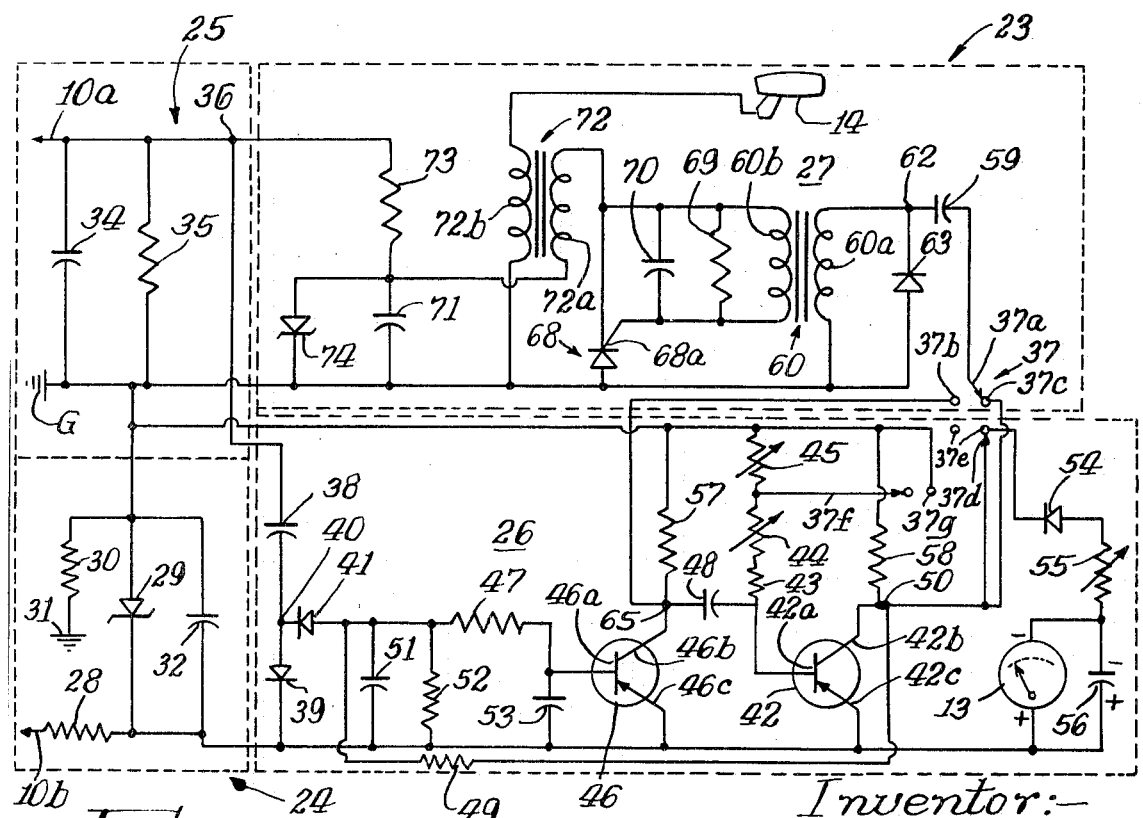
FIG. 2 is a schematic circuit diagram thereof.

More specifically, as shown in FIG. 2, the tester control circuit generally designated 23 includes a low voltage circuit portion generally designated 24, a high voltage circuit portion generally designated 25, a monostable multivibrator portion generally designated 26, and a pulse generator portion generally designated 27. The low voltage circuit portion 24 is adapted to be connected to the battery 20 and includes a resistor 28 connected to the terminal 10b. A Zener diode 29 is connected in series with resistor 28 and a resistor 30 to case 31 of the tester 10. Illustratively, the Zener diode maintains the voltage supply from the battery at 9.1 volts. Resistor 30 precludes arcing as a result of an improper connection of the tester 10, providing a low impedance path from the control circuit 23 to the tester case 31. A capacitor 32 connected in parallel with the diode 29 effectively shunts to ground G high frequency signals such as may be picked up from the ignition system 12. As indicated briefly above, the high voltage circuit portion 25 of the control circuit 23 is adapted to be powered by the high voltage circuit of the automotive ignition 12. Thus, terminal 10a of the tester 10 is connected to the spark plug electrode 22 by suitable lead 33 whereby the relatively high low current voltage impressed periodically on the spark plug electrode is delivered to the power supply portion 25. Illustratively, in the conventional automotive ignition circuit, the normal spark plug voltage may be approximately 4000 volts being applied to the spark plug terminal at spaced intervals, as shown in FIG. 3(a). A capacitor 34 is connected between terminal 10a and ground G to be charged by the intermittent high voltage delivered to terminal 10a. A voltage dropping resistor 35 is connected in parallel with capacitor 34 and is preselected to provide a preselected high direct current voltage at point 36. More specifically, capacitor 34 may comprise a .25-μfd. 600-volt capacitor and resistor 35 may comprise a 6.8 megohms, ½ watt resistor to provide an average voltage at point 36 of approximately 150 volts, as shown in FIG. 3(b) when the automotive engine (not shown) is operating at approximately 2000 r.p.m. The voltage may vary in accordance with an increase or decrease in the engine speed. It should be noted that the high voltage circuit 25 effectively prevents firing of the spark plug 15a during the testing operation although it does not affect the ignition advance signal provided thereto from the distributor 16.

The monostable multivibrator portion 26 of the control circuit 23 provides suitable signals to the pulse generator portion 27 for controlling the timing light, as discussed above. As shown in FIG. 1, the tester 10 includes a manually operable switch 37 which is disposed selectively in a "Timing" position wherein a moving contact 37a engages a fixed contact 37b thereof, and an "Advance" position wherein the moving contact 37a engages a fixed contact 37c and a second moving contact 37d engages a fixed contact 37e thereof. The multivibrator is arranged to provide a trigger signal to the pulse generator at the time the voltage pulse is delivered to the spark plug 15a when the switch 37 is thrown to the "Timing" position wherein moving contact 37a engages fixed contact 37b. When the switch is thrown to connect the moving contact 37a to fixed contact 37c and moving contact 37d to fixed contact 37e, the signal delivered from the multivibrator to the pulse generator is delayed.

More specifically, the multivibrator is controlled by a trigger pulse obtained by differentiating the voltage waveform shown in FIG. 3(b). For this purpose, a capacitor 38 and diode 39 are connected in series from point 36 to resistor 28. The input trigger signal delivered to the multivibrator portion 26 appears at point 40. Diode 41 blocks any pulses which may appear whenever the spark plug voltage, as shown in FIG. 3(b), contains "hash."

A first control transistor 42 has its base 42a connected through a resistor 43 and a pair of adjustable resistors 44 and 45 to ground G. Thus, transistor 42 is normally on. A trigger pulse from point 40 delivered to the base 46a of a second control transistor 46 through a resistor 47 turns transistor 46 on and the voltage from collector 46b of transistor 46 is delivered through a capacitor 48 to the base 42a of the transistor 42 to turn it off. The voltage on the collector 42b of transistor 42 is delivered through a resistor 49 and resistor 47 to base 46a of transistor 46 to maintain transistor 46 on. Transistor 42 remains off until the voltage delivered through capacitor 48 returns to zero. When transistor 42 turns on again, transistor 46 is turned off by the voltage delivered to its base 46a, as discussed above. The waveform of the voltage at point 50 is shown in FIG. 3(d).

The off time of transistor 42 is a function of the time constant of capacitor 48 and resistors 43, 44, and 45. Illustratively, where capacitor 48 has a capacitance of .33 μfd., resistor 43 may have a resistance of 330 ohms, potentiometer resistor 44 may have a resistance of 5000 ohms, and potentiometer resistor 45 may have a resistance of 25,000 ohms. Resistor 44 comprises a compensating resistor to adjust the control for variations in the characteristics of transistors 42 and 46. Resistor 45 comprises a potentiometer which is adjusted by the manual operation of knob 11 to vary the time delay of the "Timing" pulse. As discussed above, the operator manipulates knob 11 to adjust the time delay of the operation of the timing light 14 to bring the engine timing mark back to the position observed at the initial control speed. The resistor 43 comprises a safety resistor limiting the current flow to the base 42a of transistor 42 in the event that each of adjustable resistors 44 and 45 is adjusted to zero resistance.

To prevent false triggering of the multivibrator by spurious noise signals in the control circuit wiring, a capacitor 51 is connected in parallel with a resistor 52 across a parallel connection of resistor 47 and a second capacitor 53 with the base 46a of the transistor 46 being connected to between resistor 47 and capacitor 53. Illustratively, capacitor 51 may have a capacity of .16 μfd., capacitor 53 may have a capacity of 270 μμfd. and resistor 52 may have a value of 10,000 ohms.

Point 50 is connected through moving contact 37d, a diode 54, and an adjustable resistor 55 to meter 13, which in turn is connected to resistor 28. Thus, the meter shows the average voltage at point 50 when the switch 37 is in the "Advance" position shown in FIG. 2. Meter 13 is preferably calibrated in engine degrees advance and resistor 55 is adjusted to calibrate the meter 13 to provide an accurate representation of the degrees advance determined by the tester 10. A damping capacitor 56 may be connected across the meter 13 to prevent meter fluctuations during the use of the tester 10. Diode 54 prevents the meter 13 from reading the collector-to-emitter voltage of transistor 42 when that transistor is on. When the switch 37 is thrown to the "Timing" position wherein moving contact 37d is spaced from fixed contact 37e, the connection to the meter 13 is broken. When the switch 37 is thrown to the "Timing" position, the tester 10 may be operated unaffected by the setting of the knob 11. As shown in FIG. 2, the emitters 46c and 42c of transistors 46 and 42, are connected with one side of the meter 13 to the resistor 28 to complete the circuit.

The collector resistors 57 and 58 associated with transistors 46 and 42 respectively, may each have a value of 680 ohms. The switch 37 further includes a third moving contact 37f connected to between resistors 44 and 45 and selectively engageable with a fixed contact 37g when the switch 37 is in the "Timing" position, thus shorting out resistor 45 at this time to provide zero advance in the tester 10.

As indicated in FIG. 3(d), the collector voltage at point 50, which is delivered through moving contact 37a of switch 37 to the pulse generator 27 when the switch is in the "Advance" position, is delayed relative to the applied trigger pulses delivered to the multivibrator point 40 by an adjustable mount illustrated as $t_1$. This signal pulse is differentiated by a capacitor 59 and the primary winding 60a of transformer 60 to provide the delayed positive pulses 61 shown in FIG. 3(e) at point 62 of the pulse generator 27 between capacitor 59 and transformer primary winding 60a. As shown, the time delay incurred is equal to the time $t_1$ illustrated in FIG. 3(d). A diode 63 is connected across the transformer primary 60a to clip the undesirable negative pulses 61a, as shown in FIG. 3(e).

When the switch 37 is is thrown to the "Timing" position wherein moving contact 37a engages fixed contact 37b and moving contact 37f engages fixed contact 37g, the capacitor 59 and transformer primary 60a differentiate the square wave at point 65, the collector 46b of transistor 46. In this arrangement of the tester, the resulting positive pulse 66 at point 62 occurs simultaneously with the input trigger pulse at point 40, as illustrated by the dotted line 67 extending through the several graphs of FIG. 3. The diode 63 similarly clips undesirable negative pulses 66a at the this time, as shown in FIG. 3(g).

The trigger signals are delivered to the timing light 14 from the primary transformer winding 60a via the secondary winding 60b of transformer 60, which is connected to the gate 68a of a silicon controlled rectifier 68. A resistor 69 and capacitor 70 are connected in parallel across the secondary transformer winding 60b to shape the pulse for suitably triggering the silicon controlled rectifier 68. In pulse generator 27, the silicon controlled rectifier is normally off. A capacitor 71 is connected in parallel with the rectifier 68 through a low impedance primary winding 72a of a transformer 72. Thus, in the normal off condition of the silicon controlled rectifier, capacitor 71 charges to the voltage at point 36 through a resistor 73 which may have a value of 68,000 ohms. When a trigger pulse is produced in the transformer secondary 60b, the silicon controlled rectifier 68 is turned on and, thus, the charge on capacitor 71 is shunted to ground G through the low impedance transformer winding 72a and the silicon controlled rectifier 68. The effective shorting of the capacitor 71 produces a high peak-to-peak pulse in the secondary winding 72b of the transformer 72 which may illustratively be approximately 4000/volts, suitable for operating the timing light 14 to flash.

Upon completion of the discharge of capacitor 71, the voltage across rectifier 68 becomes zero whereupon the rectifier is turned off. This permits capacitor 71 to recharge to the average voltage across point 36. To prevent damage to the silicon controlled rectifier in the event that the voltage at point 36 becomes effectively great, a Zener diode 74 may be connected in parallel therewith to limit the voltage, illustratively, to 200 v.

Thus, the desirable reference and ignition advance indications provided by meter 13 are produced in tester 10 by the cooperative power supplies provided by circuit portions 24 and 25. As high voltage power supply 25 utilizes the available high voltage at the spark plug electrode 22 and converts this to a suitable voltage for operating the silicon controlled rectifier 68 without the need for direct current-to-direct current converters, or power supplies which must be connected to the conventional 60-cycle, 110-volt power supplies, an extremely simple and economical tester is provided having improved flexibility and facility of use.

The tester 10 is readily connected for indicating the ignition advance by suitably connecting terminal 10b to the battery terminal 20b and terminal 10a to the spark plug electrode 22. The timing light 14 may be readily connected to the terminal 10c and the tester is then used in the conventional manner with meter 13 indicating selectively the initial timing and the degrees of advance by suitable operation of switch 37. The tester 10 is arranged for a long, maintenance-free life, being comprised of relatively simple solid state circuitry.

In the illustrative embodiment, reference has been had to several illustrative parameters of the circuit constituents. A full listing thereof is set forth herebelow. As will be obvious to those skilled in the art, the illustrative embodiment is exemplary only.

Reference numeral:
```
13_____ 500 μamp. ammeter.
29_____ 9.1 v. Zener diode.
39_____ 600 v. diode.
41_____ 600 v. diode.
54_____ 600 v. diode.
63_____ 600 v. diode.
74_____ 200 v. Zener diode.
28_____ 100 ohms.
30_____ 330 ohms.
35_____ 6.8 megohms, ½ w.
43_____ 330 ohms.
44_____ 5K ohms.
45_____ 25K ohms.
47_____ 4.7K ohms.
49_____ 15K ohms.
52_____ 10K ohms.
55_____ 2K ohms.
57_____ 680 ohms.
58_____ 680 ohms.
69_____ 1.5K ohms.
73_____ 68K ohms.
37_____ 3-pole, double throw slide switch.
42_____ PNP transistor.
46_____ PNP transistor.
68_____ Silicon controlled rectifier.
72_____ 100-to-1 turns ratio transformer.
32_____ 270 μμfd.
34_____ .25 μfd.
38_____ .01μfd.
48_____ .33 μfd.
51_____ .16 μfd.
53_____ 270 μμfd.
56_____ 500 μfd.
59_____ .05 μfd.
70_____ .1 μfd.
71_____ .1 μfd.
```

While I have shown and described one embodiment of my invention, it is to be understood that it is capable of many modifications. Changes, therefore, in the construction and arrangement may be made without departing from the spirit and scope of the invention as defined in the appended claims.

I claim:

1. For use with an automotive engine having at least one spark plug, an ignition system having a low voltage direct current battery power supply and a high voltage spark plug firing power supply and a timing light, a tester for connecting the timing light to the engine for indicating the timing advance of said automotive ignition, comprising:

first means arranged to be connected to said low voltage battery power supply for defining a low voltage power supply circuit portion of said tester;

second means arranged to be connected to said high voltage spark plug firing power supply defining a high voltage circuit portion of said tester, said second means being operative to store electrical energy derived from said high voltage spark plug firing power supply;

means for developing an adjustably delayable pulse in response to a trigger pulse;

fourth means connected to a spark plug of the engine for providing a trigger pulse to said third means; and fifth means arranged to be connected to the timing light and connected to said second and third means for applying the energy stored in said second means to the timing light in response to said adjustably delayable pulse.

2. The tester means of claim 1 wherein said second circuit portion means comprises an unregulated power supply.

3. The tester means of claim 1 wherein said second circuit portion means comprises a capacitor, means for connecting said capacitor in parallel with a spark plug for charging the capacitor to a high voltage as a function of a high voltage generated by said spark plug firing power supply.

4. The tester means of claim 3 further including means for reducing the average voltage on said capacitor.

5. The tester means of claim 3 further including means for causing the average voltage on said capacitor to have a preselected value at a preselected speed of the automotive engine.

6. The tester means of claim 1 wherein said second circuit portion means prevents firing of a spark plug of the ignition system to which it is connected.

7. The tester means of claim 1 wherein said third means includes a monostable multivibrator connected to said first, low voltage circuit portion means.

8. The tester means of claim 1 wherein said second, high voltage circuit portion means provides an output high voltage varying as a function of the speed of operation of the automotive engine.

References Cited
UNITED STATES PATENTS

| | | | |
|---|---|---|---|
| 2,715,711 | 8/1955 | Wells | 324—16 |
| 3,263,126 | 7/1966 | Westberg | 315—241 |
| 3,368,143 | 2/1968 | Roberts | 324—16 |

RUDOLPH V. ROLINEC, Primary Examiner

M. J. LYNCH, Assistant Examiner

U.S. Cl. X.R.

340—268